Oct. 28, 1958   W. KNOLL   2,858,093
CABLE HOLDING DEVICE
Filed April 9, 1954   2 Sheets-Sheet 2

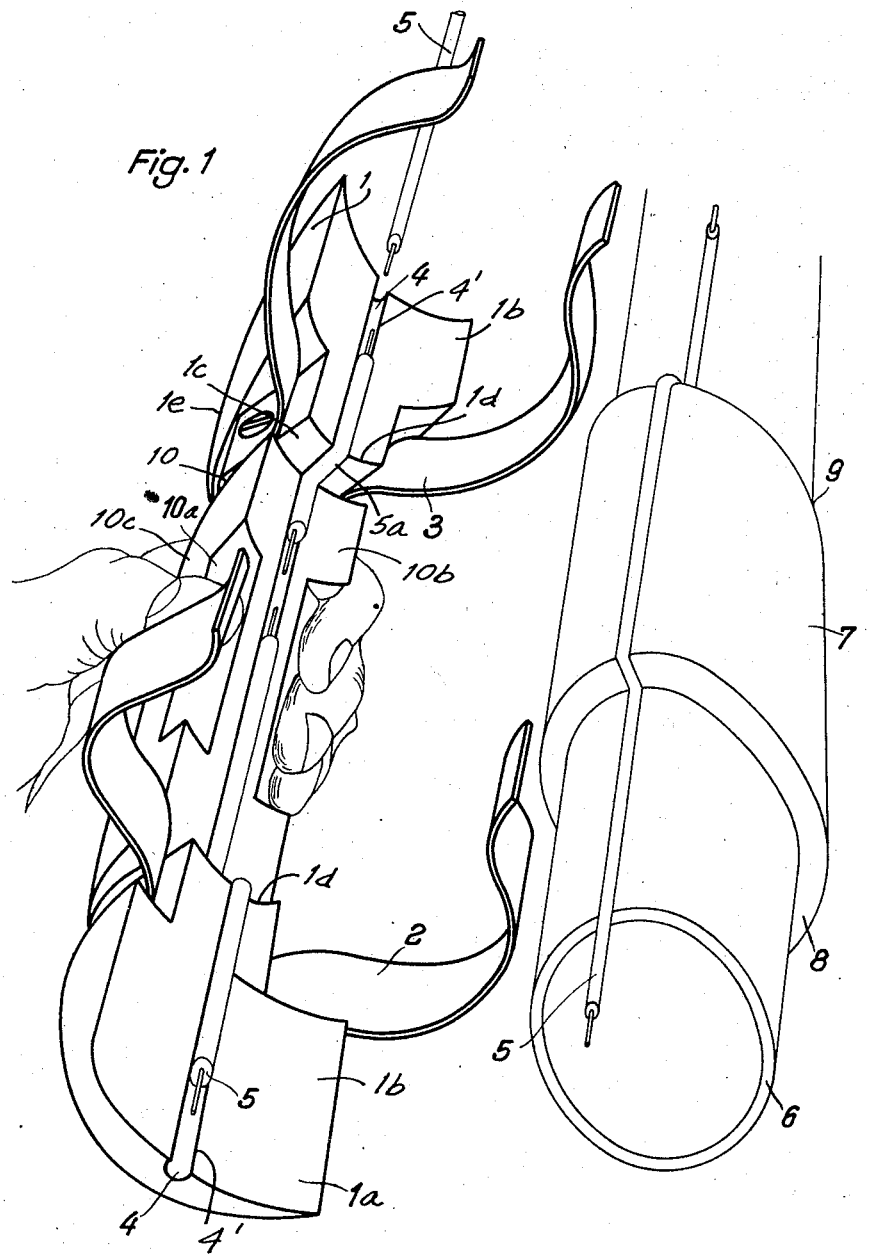

Inventor:
WERNER KNOLL
BY:

United States Patent Office 2,858,093
Patented Oct. 28, 1958

2,858,093

CABLE HOLDING DEVICE

Werner Knoll, Hamburg, Germany, assignor to Firma H. Maihak A. G., Hamburg, Germany Application April 9, 1954, Serial No. 422,141

Claims priority, application Germany April 11, 1953

9 Claims. (Cl. 248—49)

The present invention relates to a cable holding device for rods extending into a deep well and more particularly to a cable holding device for holding a cable to a rod in a position in which a bent knee portion of the cable is supported on a shoulder formed by a coupling sleeve on the rod.

It is known to arrange measuring instruments on the end of a probing rod and similar apparatus projecting into deep bores drilled in the rock, such as natural gas and oil wells, and to conduct the measuring current through a cable extending along the rod to the surface. The cables are located in the well intermediate the rod and a lining tube and are subject to being damaged during the insertion of the rod and during a pumping operation.

It is one object of the present invention to overcome the disadvantages of the known holding means for holding a cable suspended in a deep well, and to provide a cable holding device which can be easily attached and detached.

With this object in view the present invention mainly consists of a cable holding device for use with a rod projecting into a deep bore and including coupling sleeves forming transverse annular shoulders on the rod. The cable holding device according to the present invention is preferably protected against corrosion and comprises, in combination, a cable holding member having at least one cable bending edge and attaching means secured to the cable holding member and adapted to attach the same to the rod in a position in which the bending edge forms a knee in a cable located between the cable holding member and the rod.

The cable holding device according to the present invention bends two portions of the cable when attached to the probing rod so that the bent cable portions abut on the annular shoulders of a coupling sleeve preventing movement of the cable in longitudinal direction of the rod, and supporting the weight of the cable.

The invention will be best understood from the following description of specific embodiments when read in connection with the accompanying drawings, in which:

Fig. 1 is a perspective view of a preferred embodiment of the present invention, showing the rod to which the cable holding device is to be attached;

Figures 2, 3:
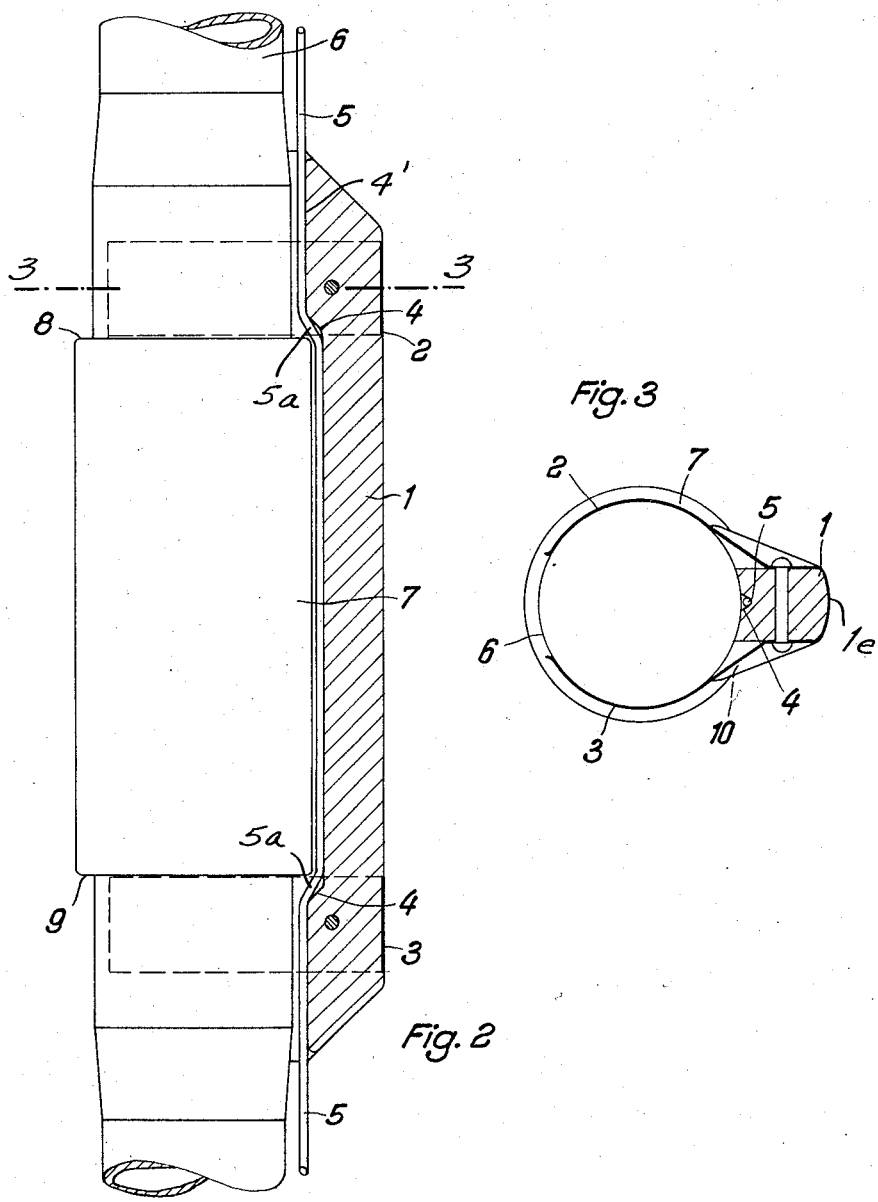
Fig. 2 is a longitudinal sectional view of a cable holding device according to the present invention.
Fig. 3 is a cross-sectional view on line 3—3 in Fig. 2.

Referring now to the drawing, the cable holding device comprises a cable holding member 1 consisting of two cable holding end portions 1a and a connecting handle portion 10 which is formed with recesses 10a permitting gripping of the handle portion.

Two pairs of clamping springs 2, 3 serve as attaching means for attaching the device to the rod or tube 6. In the illustrated embodiment the clamping springs 2, 3 engage the rod 6, abut against the shoulders 8, 9 of the coupling sleeve 7, and hold the device in proper position with respect to the coupling sleeve 7. It will be understood that the rod consists of a great number of sections connected by a plurality of coupling sleeves, of which only one is shown.

Each cable holding portion 1a has an arcuate concave face 1b co-operating with the rod 6, while the handle portion 10 has an arcuate concave face 10b co-operating with the coupling sleeve 7.

Each cable holding portion 1a has a transverse shoulder 1c. The confronting shoulders 1c cooperate with the opposite shoulders 8, 9 formed by the coupling sleeve 7 on the rod 6.

A groove 4 extends in a longitudinal direction through faces 1b and 10b and the shoulders 1c, and is adapted to receive a cable 5 which is vertically suspended adjacent the rod 6, as shown.

The device is operated in the following manner:

When the cable holding device, with a cable placed in the groove portions in the faces 1b, is pressed against the rod 6 and the coupling sleeve 7, the cable is bent by the cable bending edges and forced into the aligned grooves on the transverse faces and on the guiding face 10b of the handle portion while the clamping springs 2, 3 snap onto the rod 6.

The outwardly located portions 1e and 10c of the holding portions 1a and of the handle portion 10, respectively, are tapered and rounded so that the device can be easily inserted into a well.

It will be apparent that the clamping springs 2 and 3 serve for holding the device on the rod and need not supply pressure for holding the cable in frictional engagement with the probing rod. The cable is only supported by its bent portions 5a which abut on the annular transverse faces 8, 9 of the coupling sleeve 7. During attachment of the cable holding device of the present invention, a slight pressure is sufficient for bending the cable into its deformed shape, and for attaching the clamping springs to the rod. An axial sliding of the device is prevented by the clamping springs 2 and 3 which abut against the transverse annular faces 8 and 9 of the coupling sleeve so that the guiding faces 1c need not tightly engage the shoulders 8, 9.

While the invention has been illustrated and described as embodied in a cable holding device for bending a cable in such manner that the bent cable portion abuts on a transverse shoulder of a coupling sleeve and supports the cable, it is not intended to be limited to the details shown, since various modifications and structural changes may be made without departing in any way from the spirit of the present invention.

What is claimed as new and desired to be secured by Letters Patent is:

1. In combination with a rod adapted to project into a deep well and including at least one coupling sleeve having opposite shoulders, a cable holding device comprising a cable holding member having two confronting shoulders spaced from each other substantially the length of said sleeve; and two clamping springs secured to said cable holding member and detachably embracing said rod adjacent said sleeve, said clamping springs having two confronting edges adapted to abut of said confronting shoulders, respectively, said confronting shoulders and edges facing said opposite shoulders of said sleeve whereby two knees are formed between said opposite and confronting shoulders in a cable located between said cable holding member and said rod so that the cable is clamped to said rod.

2. In combination with a rod adapted to project into a deep well and including at least one coupling sleeve having opposite shoulders, a cable holding device comprising a cable holding member having two confronting shoulders spaced from each other substantially the length of said sleeve; and two clamping springs secured to said cable holding member and detachably embracing said rod adjacent said sleeve, said clamping springs having two confronting edges adapted to abut said confronting shoulders, respectively, each of said confronting shoulders having a groove for receiving a cable, said confronting shoulders and edges facing said opposite shoulders of said sleeve whereby two knees are formed between said opposite and confronting shoulders in a cable located in said grooves and between said cable holding member and said rod so that the cable is clamped to said rod.

3. In combination with a rod adapted to project into a deep well and including at least one coupling sleeve having opposite shoulders, a cable holding device comprising a cable holding member having two cable holding portions and an elongated handle portion connecting said cable holding portions, each of said cable holding portions having a cable bending edge formed by a longitudinal and a transverse face, said transverse faces confronting each other and being longitudinally spaced from each other substantially the length of said sleeve; and two clamping springs secured to said cable holding member and detachably embracing said rod adjacent said sleeve, said clamping springs having confronting edges adapted to abut said confronting transverse faces, respectively, said confronting faces and edges facing said opposite shoulders of said sleeve whereby two knees are formed between said opposite shoulders and confronting transverse faces in a cable located between said cable holding member and said rod so that the cable is clamped to said rod.

4. In combination with a rod adapted to project into a deep well and including at least one coupling sleeve having opposite shoulders, a cable holding device comprising a cable holding member having two cable holding portions and an elongated handle portion connecting said cable holding portions, each of said cable holding portions having a cable bending edge formed by a longitudinal and a transverse face, said transverse faces confronting each other and being longitudinally spaced from each other substantially the length of said sleeve, said longtiudinal and transverse faces being formed with grooves aligned with each other for receiving a cable extending along said rod; and two clamping springs secured to said cable holding member and detachably embracing said rod adjacent said sleeve, said clamping springs having confronting edges adapted to abut said confronting transverse faces, respectively, said confronting faces and edges abutting said opposite shoulders of said sleeve whereby two knees are formed between said opposite shoulders and confronting transverse faces in a cable located in said grooves between said cable holding member and said rod so that the cable is clamped to said rod.

5. In combination with a rod adapted to project into a deep well and including at least one coupling sleeve having opposite shoulders, a cable holding device comprising a cable holding member having two cable holding portions and an elongated handle portion connecting said cable holding portions and having a face opposite said sleeve and formed with a groove, each of said cable holding portions having a cable bending edge formed by a longitudinal and a transverse face, said transverse faces confronting each other and being longitudinally spaced from each other substantially the length of said sleeve, each of said longitudinal and transverse faces being formed with a groove, said grooves being aligned with each other and with said groove in said handle portion for receiving a cable; and two clamping springs secured to said cable holding member and detachably embracing said rod adjacent said sleeve, said clamping springs having confronting edges adapted to abut said confronting transverse faces, respectively, said confronting faces and edges facing said opposite shoulders of said sleeve whereby two knees are formed between said opposite shoulders and confronting transverse faces in a cable located in said grooves between said cable holding member and said rod so that the cable is clamped to said rod.

6. In a combination with a rod adapted to project into a deep well and including at least one coupling sleeve having opposite shoulders, a cable holding device comprising a cable holding member having two cable holding portions and an elongated handle portion connecting said cable holding portions, each of said cable holding portions having a cable bending edge formed by a longitudinal and a transverse face, said transverse faces confronting each other and being longitudinally spaced from each other substantially the length of said sleeve; and two clamping springs secured to said cable holding member and detachably embracing said rod adjacent said sleeve, each of said clamping springs including two arcuate springs secured to said holding portions and having spaced free ends, said clamping springs having confronting edges adapted to abut said confronting transverse faces, respectively, said confronting faces and edges facing said opposite shoulders of said sleeve whereby two knees are formed between said opposite shoulders and confronting transverse faces in a cable located between said cable holding member and said rod so that the cable is clamped to said rod.

7. In combination with a rod adapted to project into a deep well and including at least one coupling sleeve having opposite shoulders, a cable holding device comprising a cable holding member having two cable holding portions and an elongated handle portion connecting said cable holding portions and having a face opposite said sleeve and formed with a groove, each of said cable holding portions having a cable bending edge formed by a longitudinal and a transverse face, said transverse faces confronting each other and being longitudinally spaced from each other substantially the length of said sleeve, each of said longitudinal and transverse faces being formed with a groove, said grooves being aligned with each other and with said groove in said handle portion for receiving a cable; and two clamping springs secured to said cable holding member and detachably embracing said rod adjacent said sleeve, each of said clamping springs including two arcuate springs secured to said holding portions and having spaced free ends, said clamping springs having confronting edges adapted to abut said confronting transverse faces, respectively, said confronting faces and edges facing said opposite shoulders of said sleeve whereby two knees are formed between said opposite shoulders and confronting transverse faces in a cable located in said grooves between said cable holding member and said rod so that the cable is clamped to said rod.

8. The combination set forth in claim 4 wherein said face of said handle portion is arcuate and abuts on said sleeve, and wherein said longitudinal faces of said holding portions are arcuate and abut on said rod adjacent said sleeve.

9. The combination set forth in claim 7 wherein said face of said handle portion is arcuate and abuts on said sleeve, and wherein said longitudinal faces of said holding portions are arcuate and abut on said rod adjacent said sleeve.

References Cited in the file of this patent

UNITED STATES PATENTS

| | | |
|---|---|---|
| 1,014,009 | Koons | June 9, 1912 |
| 1,383,777 | Stephens | July 5, 1921 |
| 2,362,680 | Troupe | Nov. 14, 1944 |
| 2,400,512 | Hurtel | May 21, 1946 |
| 2,417,269 | Robertson | Mar. 11, 1947 |
| 2,422,039 | Pritchard | June 10, 1947 |

FOREIGN PATENTS

| | | |
|---|---|---|
| 585,674 | Germany | Oct. 7, 1933 |